Feb. 8, 1927.　　　　　　　　　　　　　　　　　1,616,760
T. H. RODMAN ET AL
CONTROLLER FOR MOTOR DRIVEN MACHINES OF THE MULTI-UNIT TYPE
Original Filed June 18, 1923　　4 Sheets-Sheet 1
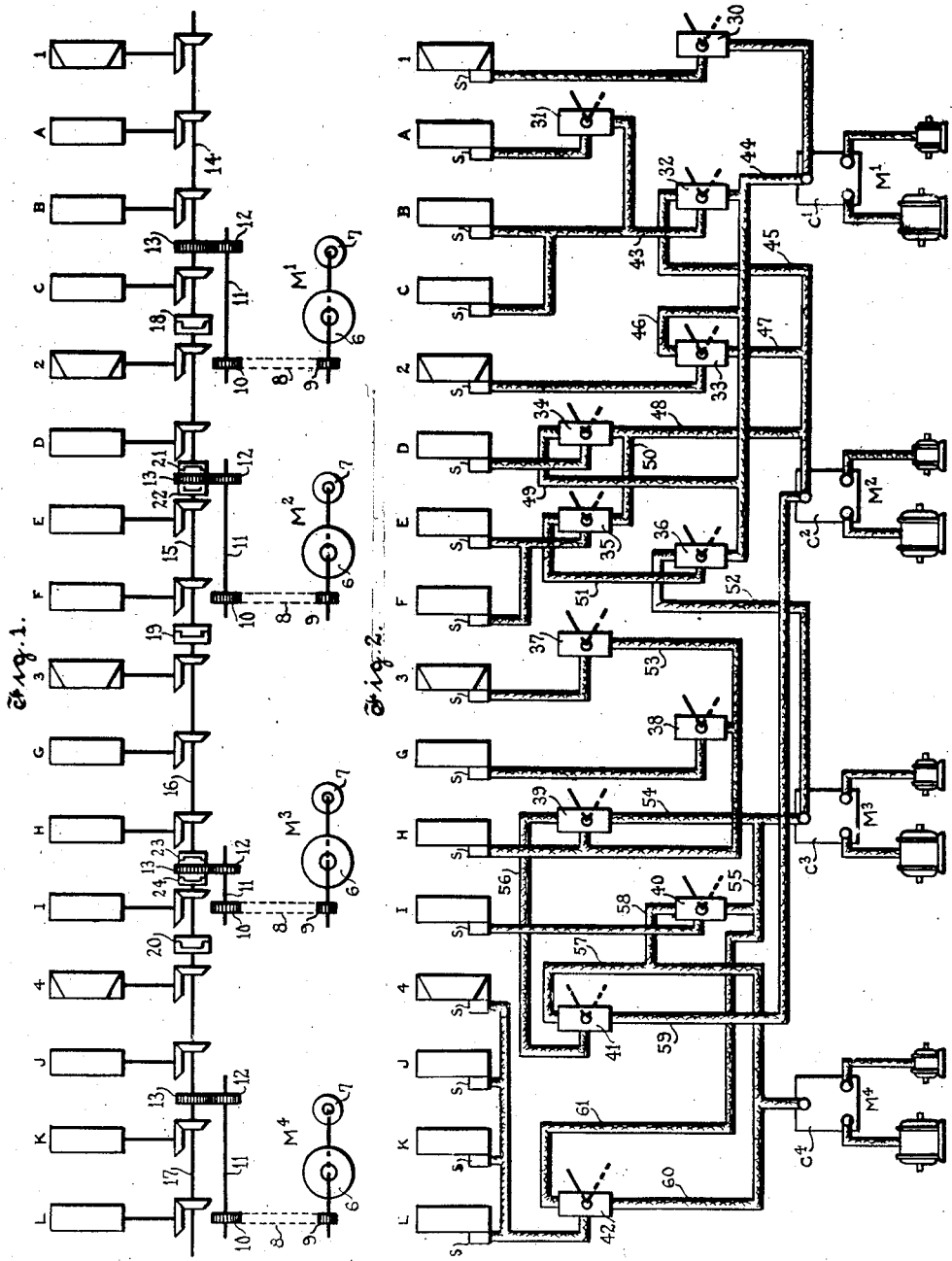
INVENTORS
Thomas H. Rodman
Paul W. Darlington
BY Frank H. Hubbard
ATTORNEY

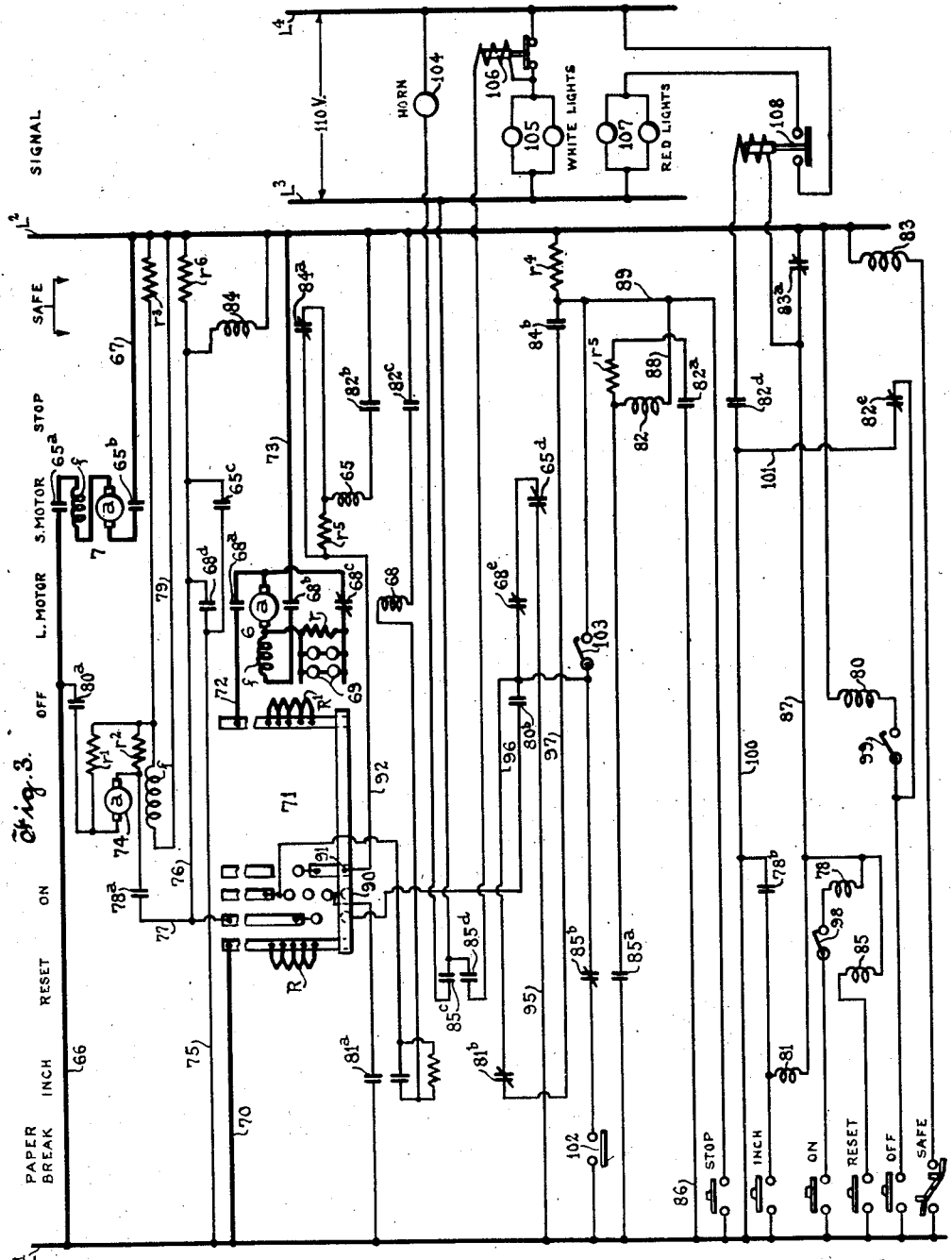

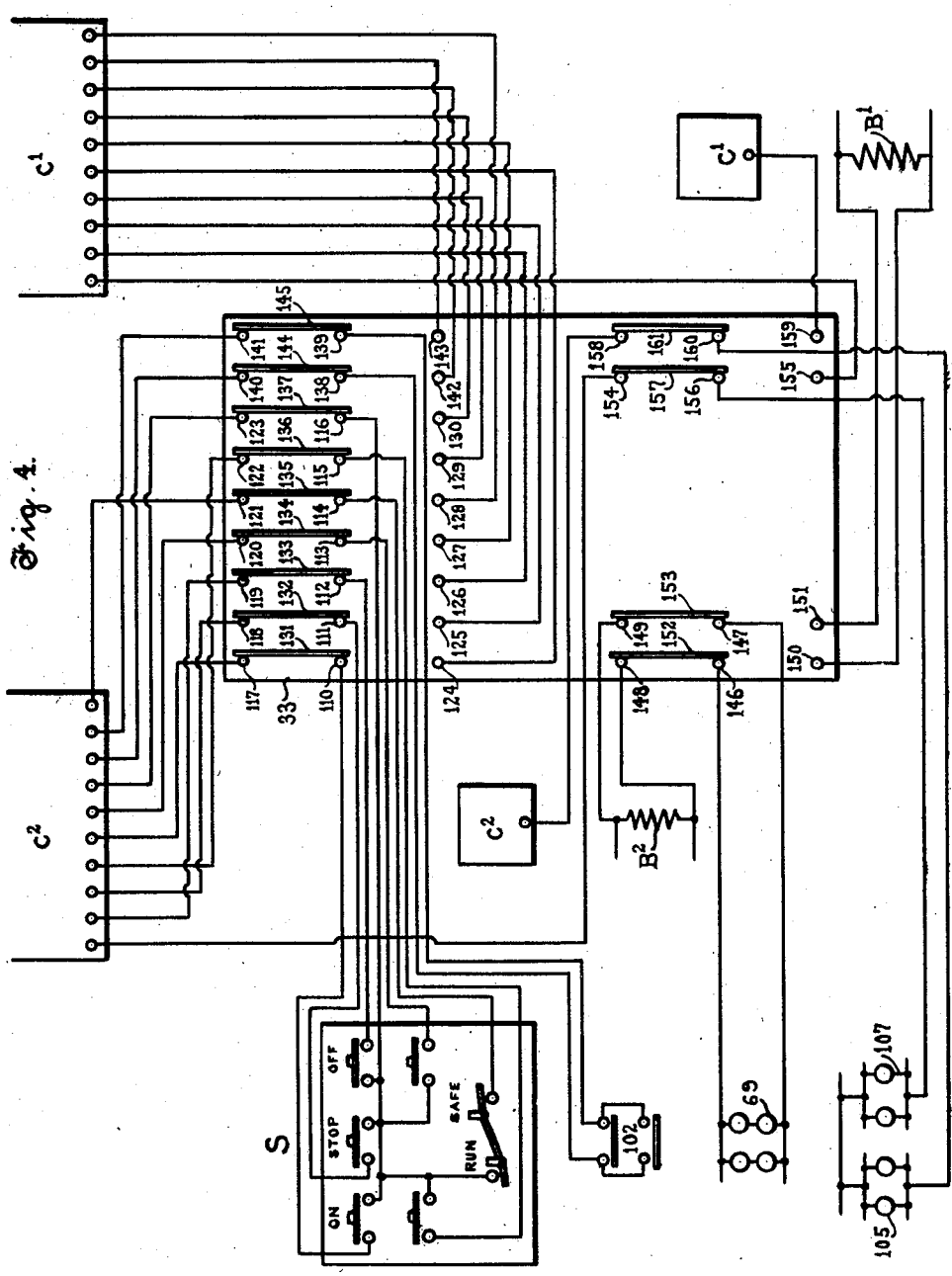

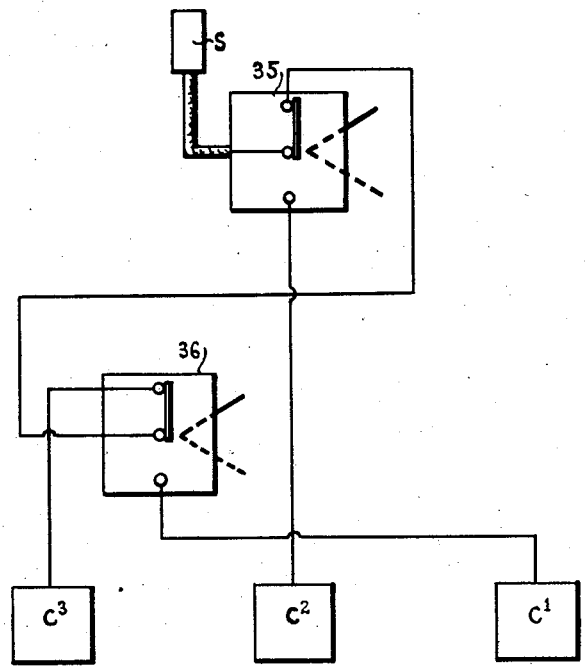

Patented Feb. 8, 1927.

1,616,760

UNITED STATES PATENT OFFICE.

THOMAS H. RODMAN, OF NEW YORK, N. Y., AND PAUL W. DARLINGTON, OF MILWAUKEE, WISCONSIN, ASSIGNORS TO THE CUTLER-HAMMER MFG. CO., OF MILWAUKEE, WISCONSIN, A CORPORATION OF WISCONSIN.

CONTROLLER FOR MOTOR-DRIVEN MACHINES OF THE MULTIUNIT TYPE.

Application filed June 18, 1923, Serial No. 646,052. Renewed June 30, 1926.

This invention relates to controllers for motor driven machines of multi-unit types and is particularly applicable to multi-unit newspaper presses.

Multi-unit presses are now quite commonly employed to facilitate and expedite printing of newspapers which vary in size and in some instances comprise as many as forty-eight pages. The unit ordinarily employed is designed to print eight pages and according to the needs of the individual plant a plurality of drives are provided whereby the units may be driven in commutatable groups. However, drive commutation has involved control commutation which has proven difficult especially for the arrangement of press units now apparently favored, namely, a straight line arrangement thereof.

As will be understood it is extremely desirable that at all times a maximum number of units be available for use, that the desired groups of units be operated by a minimum number of drives, that impairment of the press or any part thereof by a break down of any drive be guarded against, and that unnecessary complications in control circuits be avoided and the present invention has among its objects to provide commutatable control means to these ends.

Another object is to provide commutatable control means particularly applicable to units arranged in line as aforementioned.

Another object is to provide control means affording commutatable control of various elements including cylinder brakes, paper break switches and signal instrumentalities.

Various other objects and advantages of the invention will hereinafter appear.

A preferred embodiment of the invention is more or less schematically and diagrammatically illustrated in the accompanying drawings which will now be described, it being understood that the invention is susceptible of various modifications without departing from the scope of the appended claims.

In the drawings,

Fig. 1 is a schematic view of the driven units and drives therefor;

Fig. 2 is a schematic and diagrammatic view of the driven units and driving motors therefor together with commutatable control means for the motors;

Fig. 3 is a diagrammatic view of a controller for one motor drive;

Fig. 4 is a diagrammatic view showing in detail means for commutating all control instrumentalities of one unit with respect to two drives; and Fig. 5 is a diagrammatic view showing in detail means for commutating the connections between one element of a control station and the control panels of three drives.

Referring to Fig. 1 the same shows a driven machine which may be assumed to be a printing press comprising twelve printing units A to L and folders 1 to 4, one for each group of three printing units. Each printing unit may be assumed to be designed to print eight pages and each group of three printing units and folder therefor is provided with a double motor drive although it is of course to be understood that the number of units in each group may be either decreased or increased as desired.

As illustrated the group of printing units A, B, C and folder 1 has a drive $M^1$ comprising a large motor 6 and a small motor 7, said motors driving through a chain 8 and sprockets 9 and 10, a jack shaft 11 having a slip gear 12 to mesh with a gear 13 on shaft 14 to which the aforementioned printing units and folder are connected. The printing units A, B and C and folder unit 1 are each connected to shaft 14 by a set of bevel gears, one gear of each set being slidable on said shaft to disconnect its respective unit from said shaft. The remaining groups of printing units and folders are respectively provided with like motor drives $M^2$, $M^3$ and $M^4$ which drive through like connections the shafts 15, 16 and 17 of said groups. Each motor drive is preferably designed to be capable of driving as many as six printing units and one folder and the shafts 14, 15, 16 and 17 are provided with couplings therebetween and between sections thereof whereby the motors may be so employed and moreover employed alternatively.

More specifically the shafts 14 and 15 have a coupling 18 therebetween while the shafts 15 and 16 have a coupling 19 therebetween and shafts 16 and 17 have a coupling 20 therebetween. Further the shaft 15 is interrupted between units D and E and has its respective gear 13 rotatably mounted on one section thereof to be coupled to the two sections of said shaft selectively or to both by couplings 21 and 22. Similarly the shaft 16 is interrupted between units H and I, its respective gear 13 being revolubly mounted on one section and provided with couplings 23 and 24 to connect the same to the two sections of said shaft selectively or to both.

As will be apparent, the commutatable driving connections described enable the units to be operated as four sextuple presses each to print a 24 page paper or alternatively as three octuple presses each to print a 32 page paper or alternatively as two dessuple presses each to print a 40 page paper or alternatively as two sextuple presses each to print a 48 page paper. Moreover each of the aforementioned presses of four or more units may be driven by either of a plurality of drives selectively: Tabulating the possible commutations the same are as follows:

| Press. | Drive. | Folder. |
|---|---|---|
| ABC | 1 | F1 |
| DEF | 2 | F2 |
| GHI | 3 | F3 |
| JKL | 4 | F4 |
| ABCD | 1 | F2 |
| EFGH | 3 | F3 |
| IJKL | 4 | F4 |
| ABCD | 1 | F2 |
| EFGH | 2 | F3 |
| IJKL | 4 | F4 |
| ABCD | 1 | F2 |
| EFGH | 2 | F3 |
| IJKL | 3 | F4 |
| ABCD | 2 | F2 |
| EFGH | 3 | F3 |
| IJKL | 4 | F4 |
| BCDEF | 1 | F2 |
| HIJKL | 3 | F4 |
| BCDEF | 2 | F2 |
| HIJKL | 4 | F4 |
| BCDEF | 1 | F2 |
| HIJKL | 4 | F4 |
| BCDEF | 2 | F2 |
| HIJKL | 3 | F4 |
| ABCDEF | 1 | F2 |
| GHIJKL | 3 | F4 |
| ABCDEF | 2 | F2 |
| GHIJKL | 4 | F4 |
| ABCDEF | 1 | F2 |
| GHIJKL | 4 | F4 |
| ABCDEF | 2 | F2 |
| GHIJKL | 3 | F4 |

Referring now to Fig. 2 the same shows the printing units, folders and drives together with control panels $C^1$, $C^2$, $C^3$ and $C^4$ for the drives $M^1$ to $M^4$ respectively; control stations S, one for each printing unit and folder and switches 30 to 42 inclusive for effecting control commutations in accordance with the aforedescribed mechanical commutations. As will be understood, the control station of each printing unit and folder must be given control over the drive to which such unit or folder is coupled and as will be apparent from the aforedescribed mechanical commutations certain of the stations must be connected to any one of three drives. Also as will hereinafter appear, other commutations are to be effected and the switches 32 to 42 provide for all such commutations and further provide for disconnecting the control station of each printing unit or folder when silenced, Fig. 2 disclosing in general the manner in which such control is effected.

Each of the switches 30 to 42 has two positions to which it may be moved selectively, one position being indicated by the full line extending obliquely from the right hand side thereof and the other position being indicated by the dotted oblique line. Each switch when positioned as indicated by the full line serves to connect the cable leading thereto from the left to the cable, if any, leading from the upper end thereof, while in the absence of the latter cable the switch disconnects the former cable from circuit. On the other hand each switch when positioned as indicated by the dotted line connects the cable leading thereto from the left to the cable leading from its lower end.

More specifically switch 30 when in its dotted line position connects the control station of folder 1 to the control panel $C'$ of drive $M'$, whereas, said switch in its full line position disconnects the control station of the folder from circuit as is desired when said folder is silenced. Switch 31 when in dotted line position parallels the control station of printing unit A with those of printing units B and C, whereas switch 32 when in dotted line position connects the cable 43 common to said control stations with cable 44 leading to control panel $C'$ of drive $M'$. On the other hand when switch 31 is in its full line position it disconnects the control station of printing unit A as is desired when said unit is silenced whereas switch 32 when moved to its full line position connects the cable 43 common to units A, B and C to the cable 45 leading to control panel $C^2$ of drive $M^2$. Switch 33 when in its full line position connects the control station of folder 2 to cable 46 and thence by cable 44 to control panel $C'$ to drive $M'$, whereas, said switch when in dotted line position connects said control station to cable 47 and thence by cable 45 to control panel $C^2$ of drive $M^2$. Switch 34 when in dotted line position connects the control station of printing unit D to cable 48 and thence by cable 45 to control panel $C^2$ of drive $M^2$, whereas said switch when in full line position connects said station to cable 49 and thence by cable 44 to control panel $C'$ of drive $M'$. Switch 35 when in dotted line position connects the paralleled stations of printing units E and F to cable 50 and thence by cables 48 and 45 to control panel C² of drive M² in parallel with the control station of printing unit D, when the latter is connected to said panel. On the other hand the switch 35 when in full line position connects the paralleled stations of printing units E and F to cable 51 and thence through switch 36 when in dotted line position to cable 44 leading to control panel C' of drive M'. On the other hand when switch 36 is in its full line position the paralleled stations of printing units E and F are connected to cable 52 leading to control panel C³ of drive M³. Switch 37 when in dotted line position connects the control station of folder 3 to cable 53 and thence through switch 39 when in dotted line position to cable 54 leading to control panel C³ of drive M³. Similarly the switch 38 when in dotted line position connects the control station of printing unit G to cable 53 thus paralleling said station with the station of folder 3. On the other hand when switches 37 and 38 are moved to their full line positions they disconnect the control stations of folder 3 and printing unit G as is desired when the latter are silenced. Switch 39 when connecting the control stations of folder 3 and printing unit G to control panel C³ also connects the control station of printing unit H to the common cable 54 and switch 40 when in dotted line position connects the control station of printing unit I to cable 55 and thence to cable 54 thus paralleling the control stations of folder 3 and printing units G, H and I. On the other hand switch 39 when in full line position connects the paralleled control stations of folder 3 and printing units G and H to cable 56 and thence through switch 41 when in its full line position to cable 57 leading to control panel C⁴ of drive M⁴, and assuming switch 40 to be in its full line position the control station of printing unit I is connected to cable 58 and thence to cable 57 whereby the latter control station is again paralleled with the stations of folder 3 and printing units G and H. On the other hand switch 41 when in its dotted line position connects cable 56 to cable 59 for connection of the control stations of folder 3 and printing units G and H to controller C² of drive M². Switch 42 when in dotted line position connects the paralleled control stations of folder 4 and printing units J, K and L to cable 60 leading to control panel C⁴ of drive M⁴ and when in full line position connects said stations to cable 61 leading to panel C³ of drive M³.

Considering Fig. 3 the same shows a preferred form of controller for each drive and in this figure the motors 6 and 7 of one drive are illustrated diagrammatically. These motors are for simplicity of illustration shown as comprising armatures $a$ and series field windings $f$ but it is to be understood that the motors may be of any preferred type and are preferably compound wound. Also for simplicity of illustration the controller has been shown diagrammatically in an across-the-line manner with the several contacts and windings of each switch vertically aligned under a legend denoting the function thereof.

The small motor 7 is adapted to be connected across lines L' and L² by an electro-responsive switch vertically aligned therewith, said switch having a winding 65 and contacts 65ª and 65ᵇ to be engaged upon response of said winding to complete the circuit of said motor. As will be apparent the circuit of motor 7 extends from line L' by conductor 66 through contacts 65ª to and through the motor 7 thence through contacts 65ᵇ to line L².

The large motor 6 is controllable by an electro-responsive switch vertically aligned therewith, said switch having a winding 68 and contacts 68ª and 68ᵇ to be engaged upon response of said winding to complete connections for said motor. Also the control switch for this motor has contacts 68ᶜ which are engageable to complete a dynamic braking circuit for said motor, said circuit including a resistance $r$ and the windings 69 of suitable brakes for the press cylinders said windings paralleling said resistance. The contacts 68ᶜ are normally engaged as indicated by the oblique line drawn therethrough and are adapted to be disengaged to interrupt the braking connections when the contacts 68ª and 68ᵇ are engaged to establish running connections. The circuit of the large motor may be traced from line L' by conductor 70 through a cross head type controller 71 and the resistances R and R' thereof by conductor 72 through contacts 68ª to and through said motor and thence through contacts 68ᵇ to conductor 73 and line L². In practice the controller 71 is commonly provided with contacts and resistances to regulate the shunt field of the motor but as the shunt field has been omitted said regulating means have also been omitted.

The controller 71 has a reversible pilot motor 74 for moving its cross head in opposite directions, said motor being shown as comprising an armature $a$ and series field $f$. This pilot motor is under the control of so-called "on" and "off" relays and under the control of the former it moves the cross head in a direction to exclude resistances R and R' while under the control of the "off" relay it moves the crosshead in a reverse direction. One circuit for the pilot motor may be traced from line L' by conductor 75 through normally disengaged contacts 65ᶜ of the small motor switch or alternatively through normally disengaged contacts 68ᵈ of the large motor switch by conductors 76 and 77 through "on" relay contacts 78ª to and through the motor armature from right to left and thence through a resistance $r'$ and series field $f$ to conductor 79 and line $L^2$, the armature and resistance $r'$ being paralleled by a resistance $r^2$ and the series field being paralleled by a resistance $r^3$. An alternative circuit for the pilot motor may be traced from line $L'$ by conductor 66 through contacts $80^a$ of the "off" relay to and through the motor armature from left to right and thence through resistance $r^2$ and field $f$ to line $L^2$, the field being paralleled as before and the motor armature and resistance $r^2$ being paralleled by resistance $r'$.

In addition to the "on" and "off" relays which are respectively provided with operating windings 78 and 80 the controller includes an "inch" relay having an operating winding 81, a "stop" relay having an operating winding 82, a "safe" relay having an operating winding 83, a "safe after inch" relay having an operating winding 84 and a "reset" relay having an operating winding 85. All of these relays except the "safe after inch" are under the control of a push button station S and as will appear the arrangement is such that whenever both of the controlled motors are stopped the "reset" relay must be energized prior to restarting either for inching or continuous operation.

The "reset" relay is energizable by depression of the "reset" button of control station S said button completing circuit from line $L'$ to one terminal of winding 85, the opposite terminal of said winding being connected to conductor 87 leading to line $L^2$ through the normally closed contact $83^a$ of the "safe" relay. The "reset" relay in responding closes its normally open contacts $85^a$ and thereby energizes the "stop" relay which is de-energized to effect stopping and which prevents restarting until it is again energized. The energizing circuit of the "stop" relay extends from line $L'$ through contacts $85^a$ of the "reset" relay and thence through winding 82 by conductors 88 and 89 through resistance $r^4$ to line $L^2$, said circuit being interrupted upon release of the "reset" button and consequent de-energization of the "reset" relay. However, the "stop" relay upon responding completes for itself a maintaining circuit through its contacts $82^a$ this circuit extending from line $L'$ by conductor 86 through contacts $82^a$ and a resistance $r^5$ to the upper terminal of winding 82. Thereupon starting may be effected by either the "inch" button or the "on" button.

Assuming depression of the "inch" button circuit is completed from line $L'$ to and through winding 81 of the "inch" relay by conductor 87 through "safe" relay contacts $83^a$ to line $L^2$. The "inch" relay thereupon responds and by engagement of its contacts $81^a$ completes the energizing circuit of the small motor switch, assuming the crosshead of controller 71 to stand in the position illustrated. This circuit exends from line $L'$ through contacts $81^a$ of the "inch" relay to controller contact 90 through the crosshead to contact 91 by conductor 92 through the normally engaged contacts $84^a$ of the "safe after inch" relay and thence through the coil 65 of the small motor switch to line $L^2$ through the contacts $82^b$ of the "stop" relay. However, this circuit is maintained only so long as the "inch" button is held depressed, said button when released acting to de-energize the "inch" relay which in turn opens said circuit to de-energize the small motor switch for stopping. Moreover the "safe after inch" relay is thereupon caused to act to de-energize the "stop" relay whereby the aforedescribed operation of the "reset" button must be repeated prior to restarting. More specifically the "safe after inch" relay is energized upon closure of the small motor switch, its energizing circuit extending from line $L'$ by conductor 75 through contacts $65^c$ of the small motor switch and thence through the winding 84 of said relay to line $L^2$. The relay thereupon responds to disengage its contacts $84^a$ to insert resistance $r^5$ in circuit with the winding of the small motor switch and also to engage its contacts $84^b$ which are included in a short circuit around the winding of the "stop" relay. This short circuit extends from line $L'$ by conductor 95 through contacts $65^d$ of the small motor switch, contacts $68^e$ of the large motor switch by conductor 96 through contacts $81^b$ of the "inch" relay by conductor 97 through the contacts $84^b$ to the lower terminal of the "stop" relay winding 82 but as contacts $65^d$, $68^e$ and $81^b$ are of the normally closed type to be opened upon response of their respective relays the contacts $84^b$ are ineffective to close the short circuit while either the "inch" relay or the small motor switch, or the large motor switch is energized. Thus so long as the inching operation is continued the "safe after inch" relay is ineffective to de-energize the "stop" relay but as soon as the "inch" relay is caused to open with consequent opening of the small motor switch the short circuit is completed to effect opening of the "stop" relay. Opening of the small motor switch interrupts the energizing circuit of the "safe after inch" relay but said relay has its winding 84 connected in a closed loop including resistance $r^6$ and the back discharge through this loop maintains said relay energized for a sufficient length of time to render the "stop" relay short circuit effective. Thereafter the winding 84 is de-energized for disengagement of contacts $84^b$ and consequent interruption of the aforementioned short-circuit.

Assuming depression of the "on" button of station S the same completes circuit from line $L'$ through an "on" limit switch 98 to and through the winding 78 of the "on" relay and thence by conductor 87 to line L². This effects response of the "on" relay which by engaging its contacts 78ᵇ parallels the "inch" button with the results aforedescribed and the ultimate result of starting the small motor. Also the "on" relay by engaging its contacts 78ᵃ starts the pilot motor as aforedescribed to raise the controller crosshead. Such operation of the controller if continued to its full extent starts the large motor, stops the small motor, and gradually increases the speed of the large motor, it being understood that the operation of the controller may be terminated at any time by release of the "on" button. The commutation of circuits to effect the aforestated results are well understood and being obvious from the drawing description thereof appears unnecessary.

Assuming depression of the "off" button the same effects reverse operation of the controller 71 to slow down the large motor or to start the small motor and stop the large motor according to the degree of movement of said controller. More specifically said button completes circuit from line L' to and through "off" limit switch 99 to and through the winding 80 of the "off" relay to line L² thus energizing said relay to engage its contact 80ᵃ for reverse operation of controller 71 and to engage its contacts 80ᵇ for a purpose which it is unnecessary to consider herein.

Assuming depression of the "stop" button the same completes a circuit from line L' to the lower terminal of winding 82 of the "stop" relay thereby short circuiting said winding to release said relay. The relay thereupon disengages its contacts 82ᵇ to de-energize the small motor switch and its contacts 82ᶜ to de-energize the large motor switch assuming closure of either or both of the same. This stops the driven machine which can only be restarted after re-energization of the "stop" relay through the medium of the "reset" relay and "reset" button as aforedescribed. In the meantime the controller 71 is caused to return to normal position by energization of the "off" relay through contacts 82ᵉ of the "stop" relay said contacts completing circuit from line L' by conductors 100 and 101 to "off" limit switch 99 and thence to and through winding 80 to line L².

The "safe" switch of station S provides for connection of winding 83 directly across the line and hence for energization of the "safe" relay to disengage contacts 83ᵃ which as will be apparent prevents restarting pending de-energization of said relay.

A "paper break" switch 102 serves upon interruption of the feed to press to complete a short circuit for the winding of the "stop" relay. This short circuit extends from line L' through switch 102, normally engaged contacts 85ᵇ of the "reset" relay and a stop limit switch 103 to the lower terminal of winding 82. The limit switch 103 is closed in all positions of the controller 71 except its off or normal position and hence maintains said short circuit during the return movement of said controller, but thereupon opens the same to permit restarting at will.

The aforementioned signaling means includes a horn or other audible signal device 104 which is connected across the 110 volt circuit L³—L⁴ by the contacts 85ᶜ of the "reset" relay when energized. Also the signaling means includes white lights 105 to be connected across the circuit L³—L⁴ by a relay 106 said relay having its winding connected across the same circuit through contacts 85ᵈ of the "reset" relay and its own contacts. Accordingly upon response of the "reset" relay the relay 106 is caused to repeatedly open and close to effect flashing of the white lights thus indicating preparation for starting. Further the signaling means includes red lights 107 to be connected across circuit L³—L⁴ by a relay 108 when energized said relay having its winding connected across lines L'—L² through contacts 82ᵈ of the "stop" relay and contacts 83ᵃ of the "safe" relay. Thus the red lights are connected to indicate when the "safe" and "stop" relays are set for starting.

Referring to Fig. 4 the same shows the control station S, cylinder brakes 69, paper break switches 102 and signaling devices 105 and 107 for one driven unit together with means for commutating such elements with respect to two drives represented by control panels C' and C², which are respectively supplemented by signal relay panels c' and c² and dynamic braking connections B' and B². The commutating switch which may be assumed to be switch 33 comprises contacts 110—116 respectively connected to the switches of station S, a set of contacts 117—123 respectively connected to appropriate terminals of the panel C², a set of contacts 124—130 respectively connected to appropriate terminals of panel C' and a set of movable contacts 131—137 to connect the contacts of the first mentioned set to corresponding contacts of the second and third mentioned sets selectively. Thus the control station S may be appropriately connected to either of the two control panels by merely shifting the contacts 131—137.

Also the transfer switch comprises contacts 138 and 139 respectively connected to opposite sides of the paper brake switches 102, contacts 140 and 141 connected to appropriate terminals of control panel C², contacts 142 and 143 connected to appropriate terminals of panel C' and movable contacts 144 and 145 whereby contact 138 may be connected to contacts 140 and 142 selectively and contact 139 may be connected to contacts 141 and 143 selectively. Thus provision is made whereby the paper brake switches may be connected to panels C² and C' selectively by merely shifting the contacts 144 and 145.

The transfer switch further includes contacts 146 and 147 respectively connected to opposite sides of the circuit of the cylinder brake windings, contacts 148 and 149 respectively connected to opposite sides of the braking circuit B², contacts 150 and 151 respectively connected to opposite sides of the braking circuit B' and movable contacts 152 and 153 co-operating with the former contacts for connection of the cylinder brakes to either braking circuit. Also the transfer switch includes contacts 154 and 155 respectively connected to terminals on control panels C² and C', a contact 156 connected to the red lights 107 and a movable contact 157 to connect contact 156 to contacts 154 and 155 alternatively. Hence assuming 154 and 155 to be connected to terminals of panels C² and C' which in turn are connected to line L⁴ of the low voltage circuit through the signal relays 108 of said panels shifting of contact 157 provides for placing the red lights under the control of either panel at will. Finally the transfer switch is provided with contacts 158 and 159 respectively connected to the signal relay panels c² and c', a contact 160 connected to the white lights 105 and a movable contact 161 to connect contact 160 to contacts 158 and 159 alternatively. Hence assuming contacts 158 and 159 to be connected through the relays on panels c² and c' to low voltage line L⁴ shifting of the contact 161 provides for placing the white light under the control of either panel at will.

As will be apparent the aforedescribed contacts of the transfer switch are so arranged that all movable contacts thereof may be shifted together in the same direction to effect the desired commutations, i. e., upwardly to effect all commutations required for employment of the drive under the control of panel C² and downwardly to effect all commutations required for employment of the drive under the control of panels C' it being assumed that such drives are employed alternatively for one press unit.

Referring to Fig. 5 the same shows a control station S with one control circuit leading therefrom and means for connecting said circuit to the appropriate terminal of any one of three control panels which may be assumed to be panels C', C² and C³. The commutating switches may be assumed to be switches 35 and 36 each having omitted therefrom all contacts except those required for commutating the single control circuit illustrated which is typical of all circuits to be commutated as between any one control station and any three control panels, or any single set of paper break switches or single set of red lights and any three panels, or any one set of cylinder brakes and any three dynamic braking circuits or any one set of white lights and any three signal relay panels. The switch 35 in the position shown connects the station S to switch 36 and the latter connects said station to panel C³. On the other hand by moving switch 36 to its dotted line position the circuit from the control station may be shifted to panel C' and by moving the switch 35 to its dotted line position said circuit may be shifted to panel C². Thus Fig. 5 in conjunction with Figs. 2 and 4 serves to disclose fully all electrical commutations necessary to meet the requirements of the mechanical commutations aforedescribed.

What we claim as new and desire to secure by Letters Patent is:

1. In a control system for a plurality of driven units commutatably connected to a plurality of drives, in combination, a plurality of control stations one for each driven unit and commutating means for giving each station control over any drive acting on its respective unit, said commutating means rendering certain of said stations independent of all remaining stations for use in connection with at least three drives selectively.

2. In a control system for a plurality of driven units commutatively connected to a plurality of drives, in combination, a plurality of control stations one for each driven unit and commutating means for giving each station control over any drive acting on its respective unit, said commutating means including two separately operable double throw switches whereby certain of the elements of one station may be utilized to control at least three drives selectively.

3. In a control system for a plurality of press units commutatably connected to a plurality of motor drives, in combination, a plurality of control stations one for each press unit, and commutating means whereby said stations may be paralleled for drive of said press units in groups of three, four, five or more units, each by a single drive.

4. In a control system for a plurality of press units commutatably connected to a plurality of motor drives, in combination, a plurality of control stations one for each press unit, and commutating means whereby said stations may be paralleled for drive of said press units in groups of three, four, five or more units, each by a single drive, said commutating means including means whereby certain of such groups of stations may be given control over a plurality of drives alternatively.

5. In a control system for a plurality of printing press units commutatably connected to a plurality of motor drives, in combination, a plurality of sets of control instrumentalities there being a set for each press unit and each set including a paper-break switch and commutating means for giving each set of control instrumentalities control over any drive connected to its respective press unit, said commutating means affording control by certain of said sets of instrumentalities of at least three drives selectively.

6. In a control system for a plurality of printing press units commutatably connected to a plurality of motor drives, in combination, a plurality of sets of control instrumentalities there being a set for each press unit, a plurality of electrically controlled cylinder brakes there being separate brakes for the several press units and commutating means for giving each set of control instrumentalities control over any drive connected to its respective press unit and establishing brake control connections between each press unit and any drive utilized therefor, said commutating means including means to commutate appropriately for drive of certain of the press units by any one of at least three different drives.

7. In a control system for a plurality of printing press units commutatably connected to a plurality of motor drives, in combination, separate control panels for the drives, separate sets of control instrumentalities for the press units, circuit commutating means whereby the connections between said control instrumentalities and panels may be varied appropriately for different drive commutations including drive of certain of the press units by any one of at least three drives and separate sets of electro-responsive signal instrumentalities for the press units, said sets of signal instrumentalities being under the control of said commutating means for connection of each to the control panel of the drive of its respective press unit.

8. In a control system for a plurality of printing press units commutatably connected to a plurality of motor drives, in combination, separate control panels for the drives, separate sets of control instrumentalities for the press units, each set including paper break switches, separate sets of electrically controlled brakes for the press units and circuit commutating means whereby the connections of the aforementioned elements may be varied appropriately for different drive commutations including drive of certain of the press units by any one of at least three drives.

9. In a control system for a plurality of printing press units commutatably connected to a plurality of motor drives, in combination, separate control panels for the drives, separate sets of control instrumentalities for the press units, each set including paper-break switches, separate sets of electrically controlled brakes for the press units, separate sets of electrically controlled signal instrumentalities for the press units and circuit commutating means whereby the connections of the aforementioned elements may be varied appropriately for different drive commutations including drive of certain of the press units by any one of at least three drives.

10. In a control system for a plurality of printing press units commutatably connected to a plurality of motor drives, in combination, separate control panels for the drives, separate sets of control instrumentalities for the press units, each set including paper-break switches, separate sets of electrically controlled brakes for the press units, separate sets of electrically controlled signal instrumentalities for the press units and circuit commutating means whereby the connections of the aforementioned elements may be varied appropriately for drive of the press units in groups of three, four, five or more units, each group having a single drive.

In witness whereof, we have hereunto subscribed our names,

THOMAS H. RODMAN.
PAUL W. DARLINGTON.